INVENTORS
ARY VAN DER LELY
CORNELIS JOHANNES GERARDUS BOM
BY
Mason, Mason & Albright
Attorneys

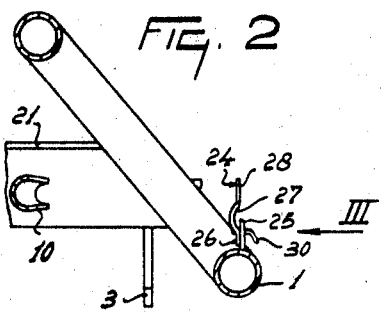
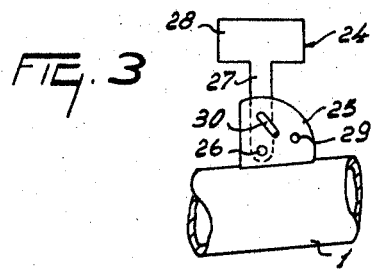
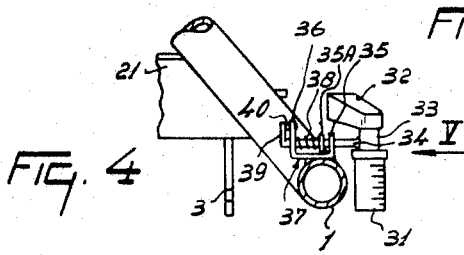
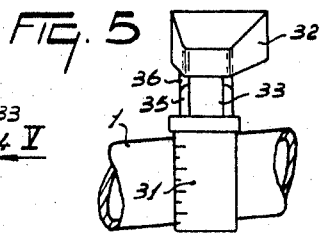
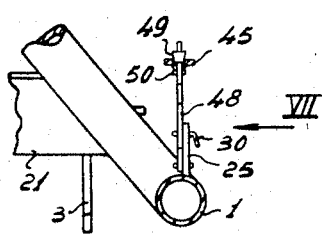
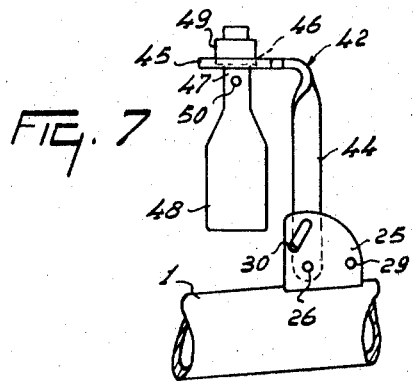
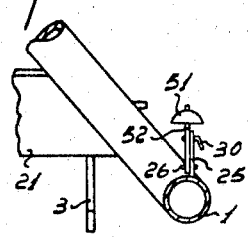
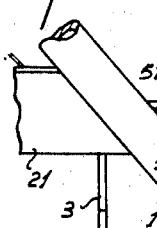
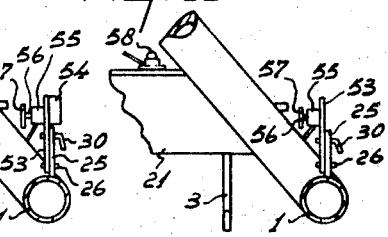

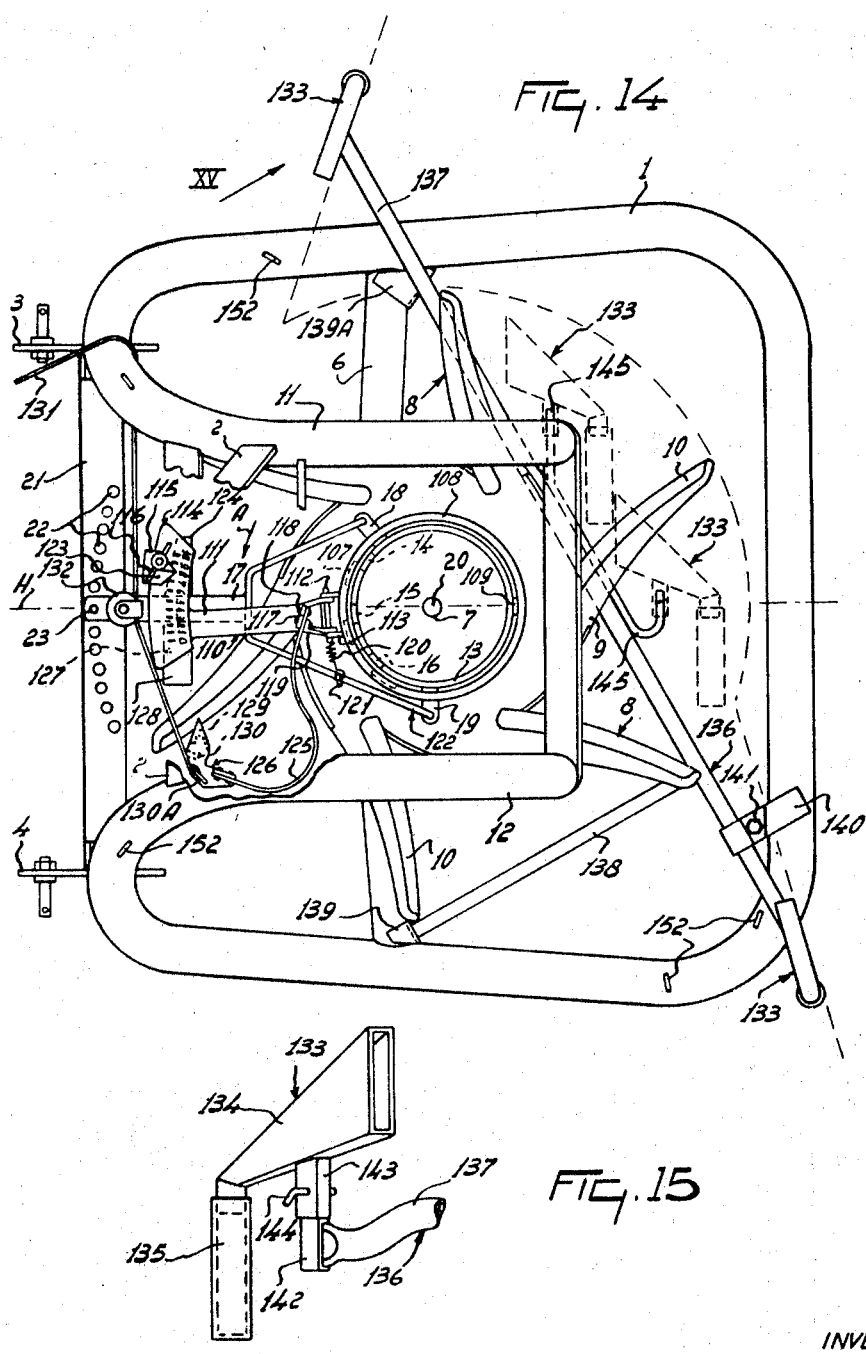

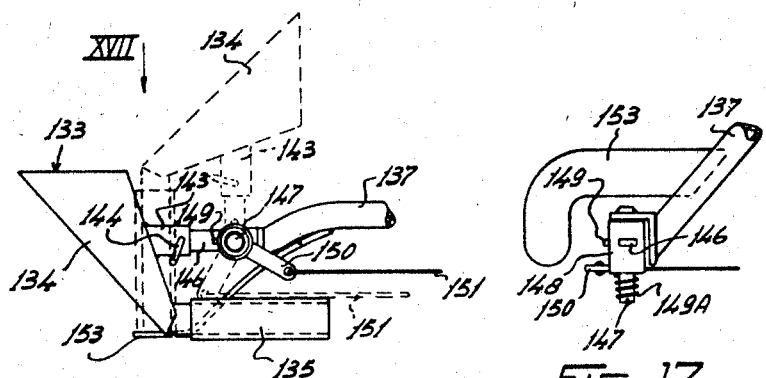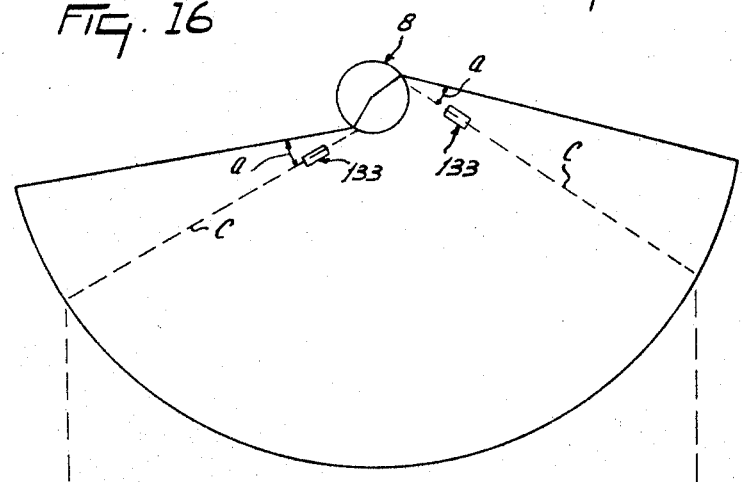

United States Patent Office 3,425,627
Patented Feb. 4, 1969

3,425,627
IMPLEMENTS FOR SPREADING POWDERED OR GRANULAR MATERIALS
Ary van der Lely, 10 Weverskade, Maasland, Netherlands, and Cornelis Johannes Gerardus Bom, 36 Esdoornlaan, Rozenburg, Netherlands
Filed Jan. 4, 1966, Ser. No. 518,593
Claims priority, application Netherlands, Jan. 7, 1965, 6500112; Jan. 28, 1965, 6501037; Nov. 24, 1965, 6515203
U.S. Cl. 239—73      55 Claims
Int. Cl. A01c 17/00, 19/00

This invention relates to implements for spreading powdered or granular materials over the ground, such implements being of the kind comprising a frame movable over the ground, a hopper for material to be spread and a rotary spreading member, the hopper having at least one outlet through which material can pass to the spreading member during use of the implement.

It is an object of the invention to make it easier for the user of such an implement to determine when the implement is correctly adjusted for working in a desired manner.

According to the invention, there is provided an implement of the kind set forth, wherein means is provided to indicate the angular setting about the axis of rotation of the spreading member of the sector throughout which material will be ejected from the spreading member during use of the implement.

Figure 1:
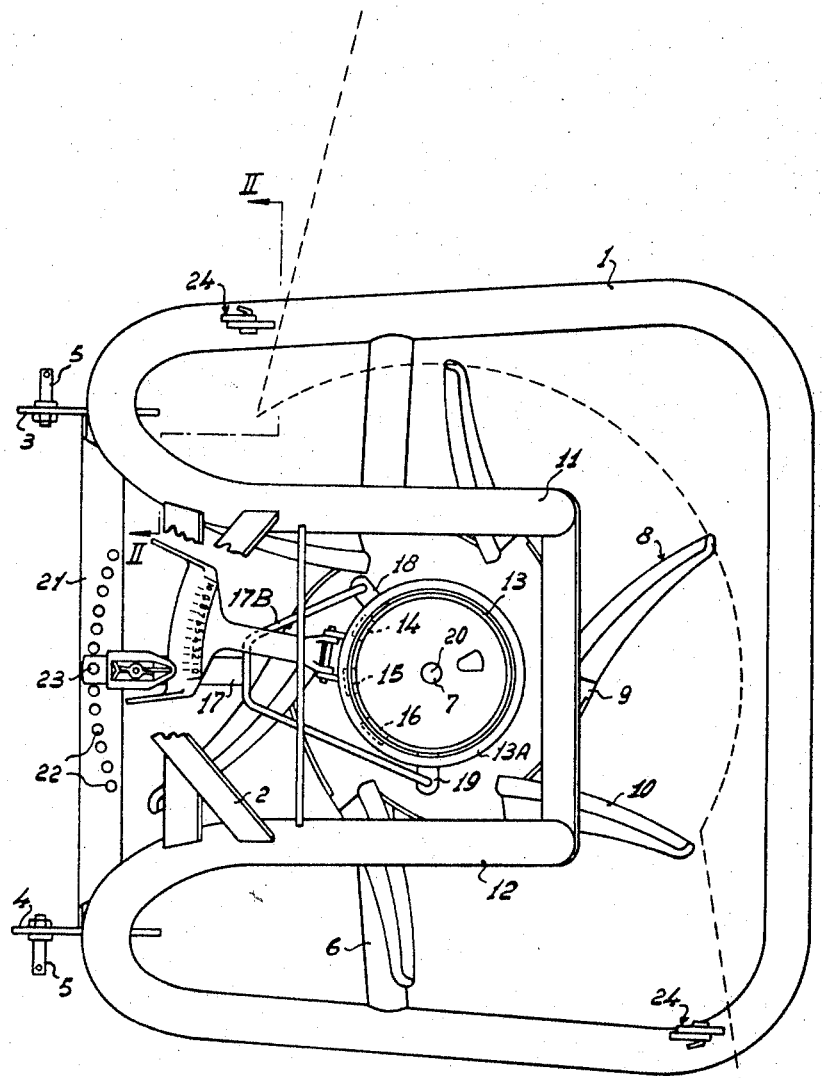
Figure 11:
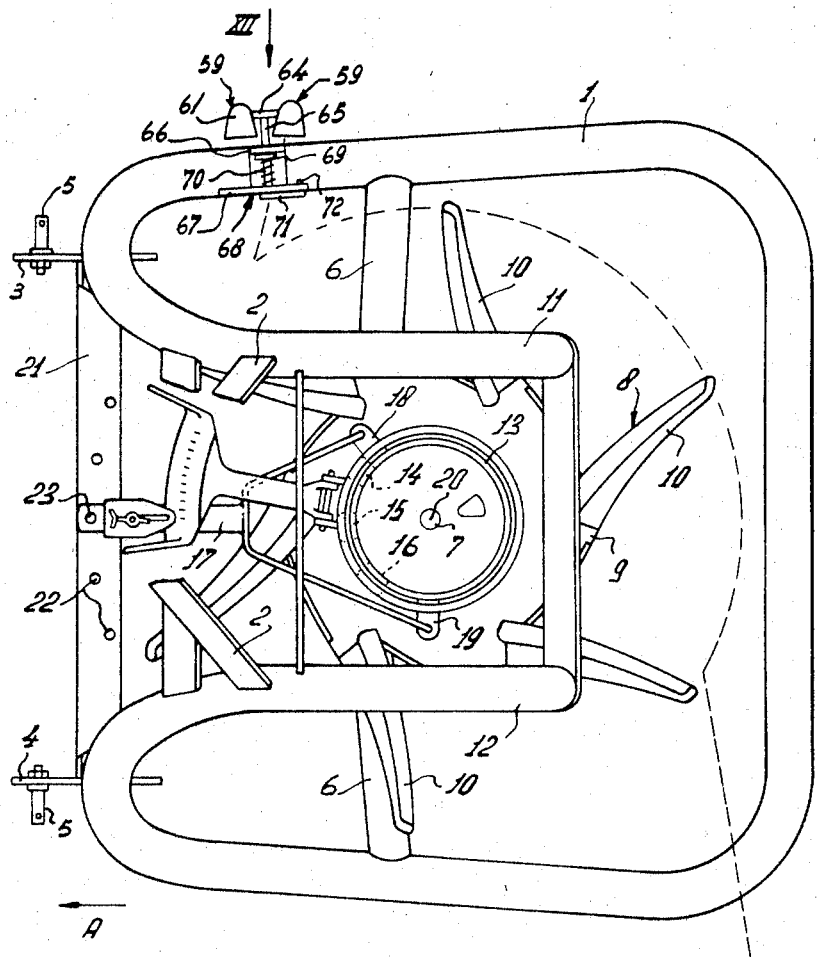
Figure 12:
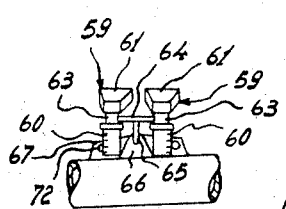
Figure 13:
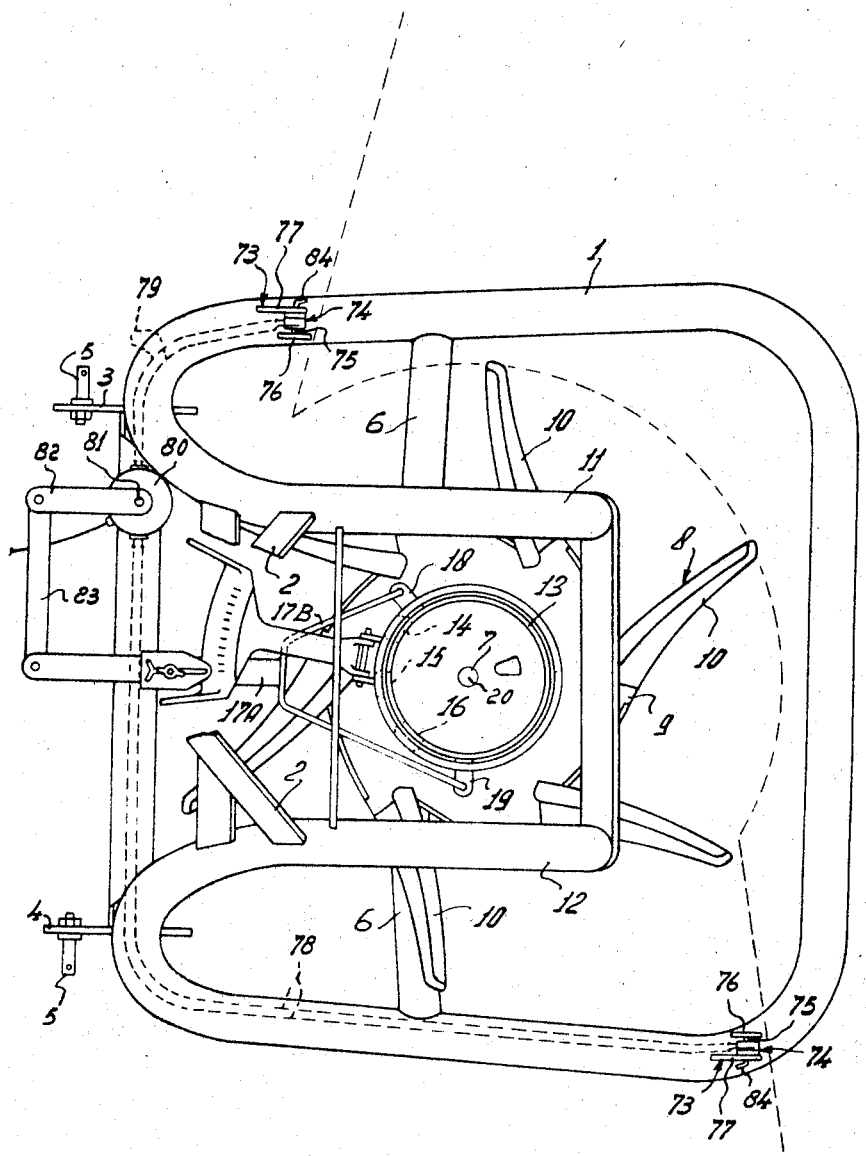

For a better understanding of the invention, and to show how the same may be carried into effect, reference will now be made, by way of example, to the accompanying drawings, in which:

FIGURE 1 is a plan view of a spreading implement in accordance with the invention with the hopper and certain other upper parts of the implement removed for the sake of clarity, FIGURE 2 is a section taken on the line II—II of FIGURE 1, FIGURE 3 is a view, to an enlarged scale, as seen in the direction indicated by the arrow III of FIGURE 2, FIGURE 4 corresponds to FIGURE 2 but shows an alternative construction, FIGURE 5 is a view, to an enlarged scale, as seen in the direction indicated by the arrow V of FIGURE 4, FIGURE 6 corresponds to FIGURES 2 and 4 and shows another alternative construction, FIGURE 7 is a view, to an enlarged scale, as seen in the direction indicated by the arrow VII of FIGURE 6, FIGURES 8, 9 and 10 correspond to FIGURES 2, 4 and 6 and show three further alternative constructions, FIGURE 11 corresponds to FIGURE 1 but illustrates an alternative construction of certain parts, FIGURE 12 is a scrap elevation as seen in the direction indicated by the arrow XII of FIGURE 11, and FIGURE 13 corresponds to FIGURES 1 and 11 but shows another arrangement in accordance with the invention, FIGURE 14 is a plan view of part of a device comprising a construction according to a further embodiment of the invention, FIGURE 15 shows on an enlarged scale an elevation in the direction of the arrow XV in FIGURE 14, FIGURE 16 is an elevation like FIGURE 15 of a further embodiment of the connection of the indicating means for determining the position of the sector throughout which material will be ejected during use of the implement, FIGURE 17 is an elevation in the direction of the arrow XVII in FIGURE 16, FIGURE 18 shows diagrammatically the place of the indicating means with respect to the sector.

Referring to the drawings, the spreading implement which is illustrated in FIGURE 1 has a frame formed principally by a bent frame beam 1 carrying strips 2 and lugs 3 and 4. The strips 2 are not shown in full but are arranged in known manner for connection to the upper lifting link of the three-point lifting device of a tractor or other supporting and propelling vehicle. The lugs 3 and 4 carry pins 5 arranged to co-operate for the same purpose with the lower lifting links of said device. A transverse frame beam 6 interconnects portions of the frame beam 1 and supports a vertical bearing (not shown) in which a vertical shaft 7 is rotatable. A spreading member that is generally indicated by the reference numeral 8 is fastened to the uppermost end of the shaft 7 and takes the form of a central disc 9 around the periphery of which six curved spreading arms 10 are equiangularly spaced.

The vertical shaft 7 affords the output shaft of a gear casing which is not visible in the drawings but which is fastened to a central region of the transverse frame beam 6. Said gear casing has an input shaft (not visible) that projects forwardly of the implement from the gear casing and which can be placed in driven communication with the power take-off shaft of the tractor or other vehicle which supports and propels the implement by way of a telescopic or other transmission shaft having universal joints at its opposite ends.

A hopper (not shown) is supported by end regions 11 and 12 of the frame beam 1 in a position over and above the spreading member 8. The hopper is releasably secured to the frame by a locking pin which also is not illustrated. The hopper has a lowermost outlet which is of cylindrical formation, said outlet being closely surrounded by a cylindrical annulus 13 the lowermost edge of which abuts against the central disc 9 of the spreading member 8. Thus, in effect, a region of the disc 9 affords the bottom of the hopper. The annulus 13 is formed with three outlet ports 14, 15 and 16 through which material from the hopper can reach the spreading member 8 during use of the implement. It will be noted from FIGURE 1 of the drawings that the outlet ports 14 to 16 are located in front of the shaft 7 relative to the intended direction of travel of the implement and during operation of the latter.

The direction in which the spreading member 8 ejects material relative to the path of travel of the implement can be varied by angularly displacing the annulus 13 around the longitudinal axis of the shaft 7. To this end, the annulus 13 is provided with two radially projecting lugs 18 and 19 through holes in which the opposite bentover ends of a rod 17B are entered. An intermediate region of the rod 17B is fastened to an arm 17 by which the whole annulus 13 can be angularly adjusted about an axis 20 coinciding with the longitudinal axis of the shaft 7. A beam 21 of the frame is formed with an arcuate row of holes 22 that are all equidistant from the axis 20 and the free end of the arm 17 carries a pin 23 a downwardly projecting portion of which can be entered in any chosen one of the holes 22. The complete row of holes 22 subtends an angle of about 40° at the axis 20 so that the annulus 13 can be adjusted to any chosen setting within this range about the lowermost cylindrical outlet of the hopper. The adjustment afforded by the holes 22 is used principally to ensure that, during operation of the implement, equal quantities of material are spread on opposite sides of a vertical plane containing the axis 20 and extending parallel to the direction of travel of the implement. It will be appreciated that adjustment will be necessary in dependence upon the inclination of the land, wind conditions and the density, degree of free-running and degree of comminution of the material to be spread.

Mechanism that is generally indicated by the reference numeral 13A is provided to control the volume of material per unit time which reaches the spreading member 8 from the hopper. The mechanism 13A comprises a ring turnably mounted on the annulus 13, three masking plates that co-operate with the respective outlet ports 14, 15 and 16, a control arm pivotally connected to said ring and a clamp carried by the arm 17, said clamp co-operating with a calibrated sector of said control arm to enable the rate of delivery through the outlet ports 14 and 16 to be placed at any desired setting between nil (outlet ports fully closed) and a maximum (outlet ports fully open). The mechanism 13A is turnable with the annulus 13 about the axis 20 and it is adjustment of said ring relative to the annulus 13 which effects adjustment of the rate of delivery of the material.

The sector around the axis 20 in which material will be delivered by the spreading member 8 is indicated by a broken line in FIGURE 1 of the drawings. The size of this sector remains unchanged but its angular setting about the axis 20 will vary in dependence upon the factors previously discussed. The angular setting of the sector about the axis 20 can be changed, as previously described, by entering the pin 23 in different ones of the holes 22. It is usually difficult to judge visually the optimum hole 22 which should be chosen under any given set of operating conditions since the volume of material which is spread by the implement per unit area of ground is generally insufficient for the material to show up clearly on the ground. Indicating means 24 are accordingly provided and it will be seen from FIGURE 1 of the drawings that said means are located at opposite sides of a vertical plane containing the axis 20 and extending parallel to the intended direction of travel of the implement. Moreover, the indicating means 24 are positioned immediately beyond the opposite ends of the aforementioned spreading sector when that sector occupies its correct angular setting about the axis 20 as illustrated in FIGURE 1. The indicating means 24 may take different forms which will hereinafter be described and, with their aid, it is possible to determine whether or not the angular setting of the spreading or distribution sector about the axis 20 is correct before a spreading operation in the field is commenced. By "correct" is meant the previously described condition in which substantially equal amounts of material are deposited on the ground on opposite sides of a vertical plane containing the axis 20 and extending parallel to the intended direction of travel of the implement.

The indicating means 24 of FIGURE 1 are shown in detail in FIGURES 2 and 3 of the drawings. It will be evident from these figures that each indicating means 24 includes a sector plate 25 fastened to the uppermost side of the frame beam 1 and a generally T-shaped plate 28 the foot of the upright 27 of which is turnably connected to the sector plate 25 by a pivot pin 26. The sector plate 25 is formed with two holes 29 at equal distances from the pivot pin 26 and the upright 27 of the T-shaped plate 28 is formed with a hole which can be brought into register with either of the holes 29. A locking pin 30 is provided for entry through aligned holes to retain the plate 28 in a corresponding angular setting about the pivot pin 26. As can be seen in FIGURE 2 of the drawings, the upright 27 of the plate 28 is of gently curved formation and it should be noted that the upright 27 is of resiliently bendable construction. When the plate 28 is in its position of use, as illustrated in FIGURES 2 and 3, the broad "cross-bar" of the plate extends substantially horizontally.

FIGURES 4 and 5 of the drawings illustrate an alternative construction to that of FIGURES 2 and 3 in which a measuring cylinder 31 is mounted alongside the frame beam 1 and is provided at its upper end with a collecting funnel 32. In the position of use shown in FIGURES 4 and 5, the collecting funnel 32 extends approximately horizontally. The funnel 32 and measuring cylinder 31 are integrally connected by a tube 33 that is perpendicularly secured to one end of a shaft 34. The shaft 34 is turnably mounted in substantially vertical limbs 35 and 36 of a bracket 37 fastened to the frame beam 1. A stop in the form of a collar 35A is fastened to the shaft 34 between the limbs 35 and 36 and a helical compression spring 38 that is wound around said shaft bears between the collar 35A and the limb 36. The end of the shaft 34 that projects to the side of the limb 36 remote from the limb 35 carries a relatively perpendicular arm 39 the free end of which, in turn, carries a pin 40 that is substantially parallel to the shaft 34. The pin 40 can be entered through either one of two holes in the bracket 36 that are equidistant from the shaft 34 to maintain the measuring cylinder 31 in either the upright operative position illustrated or an inoperative position in which it is turned through approximately 90° about the longitudinal axis of the shaft 34. It will be evident from FIGURE 4 of the drawings that the spring 38 maintains the pin 40 in the chosen hole but that the shaft 34 can be moved axially against the action of said spring when it is desired to move the pin 40 from one hole to the other.

FIGURES 6 and 7 of the drawings show a further alternative arrangement in which the previously described sector plate 25, pivot pin 26, holes 29 and locking pin 30 are employed. One end of a support strip 42 is turnably mounted on the pivot pin 26, said strip comprising a longer portion 44 connected to the sector plate 25 and a relatively perpendicular shorter portion 45. In the operative position of the indicating means which is shown in FIGURES 6 and 7 of the drawings, the portion 44 is substantially vertically disposed and the portion 45 substantially horizontally disposed. The shorter portion 45 is formed with a longitudinally extending slot 46 through which a narrow portion 47 of a strip-shaped indicating element 48 is entered. The narrow portion 47 of the element 48 is also entered through a downwardly tapering (see FIGURE 6) block 49 a lowermost part of which is lodged in the slot 46. A pin 50 is entered through the narrow portion 47 of the element 48 at the side of the strip portion 45 remote from the block 49.

FIGURE 8 corresponds to FIGURE 6 and illustrates a support 52 turnably connected to the sector plate 25 by the pivot pin 26 in the manner previously described. The support 52 carries a bell 51 at the end thereof remote from the pivot pin 26. In the arrangement of FIGURE 9, a support 53 that is turnably mounted on the pivot pin 26 carries an electric bell 54 and a switch 55 for said bell. The switch 55 has a spring-loaded plunger 56 the free end of which carries a pressure plate 57. FIGURE 10 is identical to FIGURE 9 except that the electrical bell 54 is replaced by an electric signal lamp 58 mounted on the frame of the implement.

The operation of the various indicating means illustrated in FIGURES 2 to 10 of the drawings will now be described. When the angular setting of the spreading or distribution sector of the material is being checked, the T-shaped plate 28 occupies the position shown in FIGURES 2 and 3 of the drawings in which position it is at the level of distribution of the material. If the angular setting of said sector is not correct, then one or other of the two plates 28 will be struck by the ejected material and will be bent back or will "flutter" by virtue of the bendability and/or resilience of its upright 27. If this occurs, the arm 17 can be turned until the correct setting, in which neither of the two plates 28 is struck by material, is reached. Upon attaining the correct setting, spreading of the material in the field can be started. The plates 28 are preferably first turned downwardly about the pivots 26 and retained in their inoperative settings by the locking pins 30. This prevents the plates 28 from being damaged by striking obstacles.

In the use of the arrangement shown in FIGURES 4 and 5 of the drawings, neither of the two measuring cylinders 31 will receive any substantial amount of material when the distributing or spreading sector is in its correct angular setting about the axis 20. Thus, the measuring cylinders 31 will be filled only very slowly and at approximately equal rates. However, if the angular setting of said sector is incorrect, one of the collecting funnels 32 will be located within said sector so that the corresponding cylinder 31 will be relatively rapidly filled whilst the other cylinder 31 will be filled very slowly, if at all. The construction illustrated in FIGURES 4 and 5 allows a more accurate check to be made than that illustrated in FIGURES 2 and 3. As soon as the correct setting has been obtained, spreading in the field can be started and the measuring cylinders 31 and their collecting funnels 32 are preferably first turned into inoperative positions about the axes of the shafts 34 in the manner previously described so that the likelihood of damage is brought to a minimum.

In the arrangement illustrated in FIGURES 6 and 7 of the drawings, the indicating elements 48 will not move to any appreciable extent in the slots 46 when the angular setting of the distributing or spreading sector about the axis 20 is correct. When said setting is incorrect, one or other of the indicating elements 48 will be struck by a substantial volume of the material and will rattle or flutter until the angular setting is corrected. In the arrangement of FIGURE 8, one or other of the indicator bells 51 will be struck when the angular setting of the distributing or spreading sector is incorrect. The two bells may conveniently be of different notes so that there will be a clear audible indication as to which way said sector must be turned to correct its angular setting. When the angular setting is correct, neither of the bells 51 will be struck to any appreciable extent by the ejected material.

When the arrangement of FIGURE 9 or 10 is employed, one of the two pressure plates 57 will be struck by material to close the switch 55 and ring the corresponding bell 54 or light the corresponding lamp 58 when the angular setting of the distributing or spreading sector is not correct. The correct angular setting exists when both bells 54 are silent or both lamps 58 extinguished. If desired, the lamps 58 can be mounted on the dashboard of the tractor or other vehicle which supports and propels the implement so that an indication will be given upon the angular setting of the distributing or spreading sector becoming incorrect during operation. It will be evident from the drawings and the preceding description that all the indicating means of FIGURES 6 to 10 can be turned downwardly into inoperative positions during operation of the implement if so desired.

Although it is preferred to employ two indicating means 24, it will be apparent that this is not essential and that a correct angular setting of the distributing or spreading sector can be determined quite easily with the use of but one indicating means 24 mounted at one side of the implement. In a more sophisticated arrangement in accordance with the invention, the angular setting of the annulus 13 about the axis 20 is hydraulically controlled and the two indicating means 24 are arranged to actuate hydraulic pumps, valves or the like upon their being struck by ejected material in such a way that the angular setting of the annulus 13 is automatically corrected. It will be apparent that it is not essential that the member which determines the angular setting of the distribution or spreading sector should take the form of a ported annulus. It is within the scope of the invention to employ any convenient alternative arrangement.

FIGURE 11 illustrates a spreading implement which is very similar to the implement of FIGURE 1. Accordingly, parts that have previously been described are indicated by the same reference numerals as are used in FIGURE 1 and no further description of these parts will be given. A pair of indicating means 59 are located immediately adjacent to one another on only one side of the implement. Each indicating means takes the form of a measuring cylinder 60 the upper end of which is integrally connected to a substantially horizontally extending collecting funnel 61 by a tube 63. The tubes 63 are rigidly interconnected by a relatively perpendicular rod 64 the midpoint of which is secured to one end of a support rod 65. An opposite end region of the support rod 65 is entered through the approximately vertical limbs 66 and 67 of a bracket 68 that is secured to the frame beam 1. A stop in the form of a collar 69 is fastened to the rod 65 between the limbs 66 and 67 and a helical compression spring 70 that is wound around said rod bears between the limb 67 and the collar 69. The end of the rod 65 which projects to the side of the limb 67 remote from the limb 66 carries a relatively perpendicular arm 71 the free end of which, in turn, carries a pin 72 that extends substantially parallel to the rod 65.

The limb 67 of the bracket 68 is formed with holes in which the pin 72 can be entered to retain the support rod 65 in a corresponding angular setting about its own axis. It will be evident that the support rod 65 is rotatable about its own axis and also movable axially against the opposition of the spring 70 to allow the pin 72 to be moved from one hole to another. The rod 65 can, in fact, be turned through at least 270° about its own axis so that the measuring cylinders 60 can be brought to emptying or decanting positions. When the indicating means 59 are in use, they occupy the positions shown in FIGURES 11 and 12 of the drawings. If the angular setting of the distribution or spreading sector about the axis 20 is correct, very little, if any, material will be collected by the foremost measuring cylinder 60 relative to the intended direction of operative travel of the implement which is indicated by the arrow A in FIGURE 11. The rearmost indicating means 59 relative to said direction is provided close to the foremost indicating means to accurately assess the position of the end of the distributing or spreading sector. If the foremost measuring cylinder 60 collects little or no material while the rearmost cylinder 60 collects a larger amount of material at a fast rate, then said end of the sector must be located in the correct position between the two indicating means 59. Since the two indicating means 59 are closely adjacent one another, the angular setting of the distributing or spreading sector about the axis 20 must be correct when the conditions just mentioned exist.

The spreading implement illustrated in FIGURE 13 is once again generally similar to the implement illustrated in FIGURE 1. Accordingly, those parts which are similar or identical to parts that have already been described are indicated by the same reference numerals as are used in FIGURE 1 and will not be described further. The implement of FIGURE 13 has two indicating means generally indicated by the reference numeral 73, said means occupying substantially the same positions as the indicating means 24 of FIGURE 1. Each indicating means is afforded principally by an electric switch 74 provided with a spring-loaded plunger 75 that carries a pressure plate 76. The parts 74, 75 and 76 correspond generally to the parts 55, 56 and 57 previously described with reference to FIGURES 9 and 10. Each switch 74 is connected to a region of the frame beam 1 by a corresponding support 77. The two switches 74 are connected by corresponding conductors 78 and 79 to a source of electric current (not shown) which may be located on the tractor or other supporting and propelling vehicle, and to a reversible electric motor 80 mounted on the frame of the implement. It can be seen diagrammatically in FIGURE 13 of the drawings that a shaft 81 which is arranged to be driven by the motor 80 through the intermediary of a high ratio speed-reduction gear (not illustrated) is fastened to one end of an arm 82. The opposite end of the arm 82 is pivotally connected to one end of a link 83 the opposite end of which is, in turn, pivotally connected to the free end of an arm 17A that is longer than, but otherwise generally similar to, the previously described arm 17.

In the use of the implement illustrated in FIGURE 13, the correct angular setting of the distributing or spreading sector about the axis 20 exists when neither of the pressure plates 76 is struck by any appreciable amount of material during rotation of the spreading member 8. This state of affairs is illustrated in FIGURE 13. When the angular setting of the sector is not correct, one or the other of the pressure plates 76 will be struck by ejected material and will push the corresponding plunger 75 inwardly to close the switch 74. The motor 80 is thus caused to operate to turn the arm 17A in a direction such that one end of the distributing or spreading sector is brought clear of the activated indicating means 73. As soon as no appreciable amount of material strikes the pressure plate 76, the spring of the plunger 75 opens the switch 74 and the motor 80 stops. Obviously, the output shaft of the electric motor 80 is caused to rotate in the opposite direction upon the other one of the two switches 74 being closed by ejected material striking its pressure plate 76. With the arrangement which has been described, the optimum angular setting of the spreading or distributing sector about the axis 20 is automatically maintained during a spreading operation so that minor variations in the operating conditions will not interfere more than momentarily with the efficient working of the spreading implement.

The support 77 of each indicating means 73 is provided with a locking pin 84 arranged to co-operate with holes formed in said support to enable it to be moved to an inoperative position in which the corresponding pressre plate 76 is at a different level to that at which the spreading member 8 spreads the material. It will be evident that the invention which has been described is equally applicable to spreading implements having more than one spreading member, such as the spreading member 8, and to implements in which the axis of rotation of the or each rotary spreading member is horizontal or inclined to both the horizontal and the vertical.

With the embodiment shown in FIGURE 14 the ports 14, 15 and 16 can be shut by means of members or slides 107, adapted to move around the annulus 13 along said ports. The slides 107 are fastened to an annulus 108, adapted to be turned around the annulus 13. The annulus 108 bears on the tags 18 and 19 and on a pin 109, provided on the rear side of the annulus 13. The slides 107 can be displaced with respect to the annulus 13 and be fixed by means of an adjusting mechanism 110. The adujsting mechanism 110 comprises an arm 111, which is connected with tags 113 of the annulus 108 so as to be rotatable about a horizontal shaft 112. The arm 111 is provided at its free end with a strip 114 having a scale division. The strip 114 has a displaceable stop 115, which can be fixed by means of a wing nut 116 with respect to the strip 114. The arm 111 is provided with a strip 117, to which a tag 119 is secured by means of bolts 118. The end of the tag 119 is connected with one end of a draw spring 120. The other end of the draw spring 120 is secured to a hook 121 on a bracket 122, by means of which the arm 17 is arranged on the tags 18 and 19. Under the action of the draw spring 120 the adjusting mechanism 110 tends to move in the direction of the arrow A; this movement is limited by a lug 123, which is engaged by the stop 115. The lug 123 is arranged on a side arm 124 of the arm 17. The strip 117 has secured to it one end of a leaf spring 125, the other end of which is provided with a block 126, which cooperates with a pin 127 on an arm 128. The arm 128 is secured to the arm 17. The block 126 has a V-shaped stop 129 and a guide lug 130. The face of the stop constitutes a guide surface for the pin 127. The block 126 is provided with an eyelet 131, to which a rope 132 is secured, which is guided along a roller 133 to within the reach of the driver of the tractor propelling the device in operation.

The correct position of the sector throughout which the material is delivered by the spreading member 8, that is to say the position in which equal quantities of material are spread on the ground on either side of the longitudinal center line H of the device, can be determined by means of the indicating means 134 provided on either side of the longitudinal center line of the device. These indicating means 134 comprise a collecting funnel 133, which communicates with a measuring cylinder 135. The manner in which the indicating means 134 are used for determining the position of the distribution sector will be explained more fully hereinafter.

From FIGURE 14 it will be apparent that for the indicating means 134 there is provided a separate supporting structure 136, comprising a substantially horizontal beam 137. The beam 137 has a position such that its longitudinal center line is at an acute angle to the longitudinal center line H of the device. On one side of the longitudinal center line H of the device the beam 137 is provided with a beam 138 substantially at right angles to said beam. The beam 138 is provided at its free end with a cleat 139, which is adapted to co-operate with the frame beam 6. The beam 137 is provided at one end with a cleat 139A, which is also adapted to co-operate with the beam 6. The beam 137 is furthermore provided near its other end with a cleat 140, which can be clamped around the portion of the frame beam 1 extending transversely of the travelling direction by means of a bolt 141.

Near the ends of the beam 137 vertical extensions 142 are provided for accommodating the indicating means 134. For this purpose there is provided a quick release comprising a sleeve 143 arranged on the indicating means and adapted to be slipped on the free end of an extension 142. With the aid of a pin 144, also associated with the quick release, the sleeve 143 can be fixed with respect to the extension 142.

Near the center of the beam 137 there are provided supports 145, which form the ends of a bracket 146, the web of which is secured to the beam 138. The supports 145 are constructed so that they can also co-operate with the sleeve 143 of the quick release, fastened to the funnel 133 of the indicating means 134. The pin 144 of the quick release can be used to lock the sleeve 143 with respect to the supports 145. The indicating means 134 can be arranged on the supports 145, when they are not employed. In this case they occupy a substantially horizontal position.

FIGURES 16 and 17 show an embodiment in which extensions 146 are adapted to pivot with respect to the beam 137 about a pivotal shaft 147, which, as will be seen from the FIGURE 16, extends substantially in a horizontal direction. The extension 146 is provided with a bearing 148, around the shaft 147. The bearing 148 has a pin 149, adapted to move in a slot provided around part of the shaft 147. The ends of the slot form stops for the pivotal movement of the extension about the shaft 147, which extension can thus be moved into two positions. Between the bearing 148 and the shaft 147 the shaft 147 is surrounded by a spring 149A. The spring 149A tends to hold the extension and the indicator arranged thereon in a position as is indicated by full lines. The bearing 148 is provided with an arm 150, to which a rope 151 is fastened. The ropes 151, provided one for each indicating means 134, are guided along guides 152 on the frame of the device (see FIGURE 14) to the front and can be actuated from the tractor propelling the device in operation. A plate 153 is fastened to the beam 137 so that its end forms the bottom of the measuring cylinder 135, which is open at its lower end, when said cylinder occupies its vertical position.

The use of the indicating means 134 for determining the correct position of the distribution sector will be described more fully hereinbelow. The indicating means arranged on the supporting structures near the ends of the beam 137 have to be disposed in a defined position relative to the distribution sector for carrying out a reliable, quick check.

FIGURE 18 shows diagrammatically this disposition in the distribution sector. The curve of the figure illustrates the distribution in the sector of the material spread on the ground over a distance of about 15 meters. The grains arriving, in operation, at a point located inside the sector indicated by *b* travel in the distribution sector along the line C. The disposition of the indicating means 134 has to be such, in order to permit a reliable and quick check, that the indicators are located substantially on the lines C on either side of the longitudinal center line H. The lines C are at an angle *a* of 10° to 15° to the foremost boundary lines. If the indicators are well within the sector, the measuring cylinders of the two indicators will be filled during the check over a given distance, so that the position of the sector is correct. However, if the distribution sector does not occupy a correct position, one measuring cylinder will contain a greater quantity than the other, so that the distribution sector has to be displaced by means of the arm 17. If the left-hand measuring cylinder contains a greater quantity than the right-hand one, the distribution sector has to be displaced to the right. In order to ensure that the check is made while the material is spread throughout the width of the sector, that is to say, when the spreading member has attained its full speed, two structures are disclosed in the foregoing for actuating the indicators not until the full speed of the spreading member is attained.

The first structure comprises the holes 14, 15 and 16 and the adjusting mechanism 110. When the rope 132 is pulled, the block 126 with its stop 129 will stick behind the pin 129 on the arm 128, so that the slides 107 completely shut the ports 14 to 16. This is the situation prior to the check. After the spreading member 8 has attained its full number of revolutions, the block 126 can be released from the pin 127 by pulling the rope 132, so that the annulus 108 turns under the action of the spring 120 so that the slides 107 quickly release the ports 14 to 16. The material fed to the spreading member 8 is directly spread throughout the width of the distribution sector, so that a correct check is possible.

The indicating means 134 may also be actuated by means of the structure shown in FIGURES 16 and 17. When the spreading member rotates at full speed and the material is distributed throughout the width of the distribution sector this structure permits of quickly tilting upwards the extensions 146 and the indicating means 134 arranged thereon by pulling the ropes 151 into a position indicated in FIGURE 16 by broken lines. The indicating means with the collecting funnels 133 swing into the flow of material, while the bottom of the measuring cylinder 136 is closed by the plate 153. This also provides a reliable check. By releasing the ropes 151 the extensions 146 with the indicating means can tilt back under the action of the spring 149A so that the contents of the measuring cylinders 135 can be collected.

The separate supporting structure disclosed above for the indicating means 134 permit of mounting these indicating means on any kind of fertilizer broadcaster of this type in a simple and quick manner, while the frame need not be provided with special members for this purpose. The supporting structure, as will be seen from FIGURE 14 bears at three points on the frame of the device and it can be fixed with respect to the frame at one of said points by means of the bolt 141, shown in the figure for clamping the cleat 140 around the frame beam 1.

What we claim is:

1. A spreader having a frame and a rotary spreading member supported by said frame, a regulating mechanism associated with said spreading member for defining a sector throughout which material will be ejected during operation and indicator means responsive to contact by the ejected material mounted adjacent said spreading member for determining said sector.

2. The implement of claim 1, wherein said indicator means is mounted on said frame.

3. The implement of claim 1, wherein said spreading member is rotatable about a substantially vertical axis, and said indicator means comprises two units positioned on either side of said spreader member, said units being approximately 180° apart.

4. The implement of claim 1, wherein the indicator means is a plate movably mounted on said frame.

5. The implement of claim 4, wherein the plate is resiliently connected to the frame.

6. The implement of claim 5, wherein a resilient strip connects said plate to said frame.

7. The implement of claim 4, wherein said plate extends substantially vertically during operation, said plate being suspended from a support mounted on said frame.

8. The implement of claim 1, wherein said indicator includes adjusting means whereby said indicator can be moved to an inoperative position.

9. The implement of claim 1, wherein said inidcator includes a measuring cylinder.

10. The implement of claim 9, wherein said measuring cylinder is provided with a collecting funnel.

11. An implement as claimed in claim 10, wherein said collecting funnel and said measuring cylinder are integral with one another.

12. An implement as claimed in claim 10, wherein said measuring cylinder and said collecting funnel are displaceable together about a common axis to a position in which said collecting funnel will not receive material ejected from the spreading member during operation.

13. The implement of claim 9, wherein said measuring cylinder is substantially vertically disposed.

14. An implement as claimed in claim 1, wherein said indicator means includes a signalling system.

15. An implement as claimed in claim 14, wherein said system is comprised of a bell mounted on the frame of the implement whereby said bell is sounded by material ejected from the spreading member in said sector.

16. An implement as claimed in claim 14, wherein said bell is sounded electrically.

17. An implement as claimed in claim 1, wherein said indicator means includes a signal system and said system comprises a lamp.

18. An implement as claimed in claim 1, wherein said indicator means includes a signal system and said system includes an electric switch provided with a pressure plate, said plate being arranged to be moved to close said switch upon being struck by ejected material.

19. A spreader having a frame and a rotary spreading disc, supported by said frame, said rotary disc being rotatable about a substantially vertical axis, a regulating mechanism associated with said disc for controlling the feeding of material to said disc whereby said material is ejected substantially within a predetermined sector, indicator means responsive to contact by the ejected material mounted adjacent said spreading disc for determining said sector.

20. An implement as claimed in claim 19, wherein said indicator means comprises a pair of spaced parts and each part comprises a measuring cylinder and a collecting funnel, said indicator means being turnable together about a common axis through an angle of at least 270°.

21. An implement as claimed in claim 19, wherein said regulating mechanism is associated with said indicator means through an adjusting mechanism whereby said regulating mechanism is adjusted responsive to signals received from said indicator means and the direction of ejected material is changed.

22. An implement as claimed in claim 21, wherein said adjusting mechanism is electrically energized.

23. An implement as claimed in claim 22, wherein said adjusting mechanism includes an electric motor and the indicator means includes a switch arranged to energize said motor.

24. An implement as claimed in claim 19, wherein said regulating mechanism comprises a turnable annulus mounted above said disc, said annulus having outlet ports through which material is fed to said disc, and the location of said ports with respect to said disc being adjustable by said adjusting mechanism.

25. An implement as claimed in claim 24, wherein said annulus is operatively associated with the electric motor by way of a link system whereby said annulus is turnable by said motor.

26. A spreader having a frame and a rotary spreading member supported on said frame, a regulating mechanism associated with said spreading member for controlling the sector within which material is ejected during operation, indicator means responsive to contact by the ejected material associated with said spreading member for measuring the limits of said sector, actuating means for permitting said indicator means to determine the amount of material spread at a given point within said sector.

27. An implement as claimed in claim 26, wherein said spreader comprises a hopper having an outlet and said actuating means comprises a closing member for shutting said outlet.

28. An implement as claimed in claim 27, wherein the closing member can be actuated from a distance away from said implement.

29. An implement as claimed in claim 26, wherein said actuating means comprises movable parts secured to said indicator means whereby said indicator means can be brought into operative position.

30. An implement as claimed in claim 27, wherein said indicator means is pivotable with respect to said frame.

31. An implement as claimed in claim 30, wherein said indicator means pivots against the action of a spring.

32. An implement as claimed in claim 30, wherein said indicator means pivots about a shaft supported by said frame, said shaft extending substantially horizontally.

33. An implement as claimed in claim 30, wherein a draw member is attached to said indicator means and said indicator means can be pivoted with said draw member.

34. An implement as claimed in claim 26, wherein said indicator means is located adjacent the boundary of said sector.

35. An implement as claimed in claim 34, wherein said indicator means is arranged on a line inside said sector and said line is at an angle of 10° to 15° with respect to the foremost boundary line of said sector.

36. An implement as claimed in claim 26, wherein said indicator means is mounted on said frame with separate supporting means.

37. An implement as claimed in claim 36, wherein said supporting means is attached to said frame at least at three points.

38. An implement as claimed in claim 34, wherein said supporting means comprises a structure which has at least one extension, said indicator means being mounted on said extension.

39. An implement as claimed in claim 38, wherein said structure comprises a beam which is provided near its ends with extensions and said indicator means is mounted on said extensions.

40. An implement as claimed in claim 39, wherein said extensions extend substantially in a vertical direction.

41. An implement as claimed in claim 39, wherein the center of said beam is located approximately on the longitudinal center line of said implement.

42. An implement as claimed in claim 39, wherein the longitudinal center line of said beam is at an acute angle to said longitudinal center line of said implement.

43. An implement as claimed in claim 39, wherein said beam extends substantially in a horizontal direction.

44. An implement as claimed in claim 37, wherein said indicator means can be coupled with at least one of said extensions with a quick release.

45. An implement as claimed in claim 44, wherein said quick release comprises a sleeve fastened to said indicator means, and said sleeve can be slipped on at least part of said extension.

46. An implement as claimed in claim 39, wherein at least one of said extensions is adapted to be pivoted into at least two positions relative to said structure.

47. An implement as claimed in claim 46, wherein in one position said one of said extensions is substantially vertical and in the other position substantially horizontal.

48. An implement as claimed in claim 46, wherein said one of said extensions is adapted to be pivoted by a bearing on a shaft, said shaft being fastened to said structure.

49. An implement as claimed in claim 48, wherein said bearing comprises a stop adapted to co-operate with a slot in said shaft whereby the ends of said slot determine the positions of the indicator means.

50. An implement as claimed in claim 48, wherein said indicator means comprises a collecting funnel and a measuring cylinder, said structure being provided with plate means whereby said collecting funnel is located in the path of ejected material, said plate means serving as a bottom for said measuring cylinder.

51. An implement as claimed in claim 48, wherein said one of said extensions is provided with a draw member, said draw member being connected through guides on said frame with a further draw member that can be actuated from the driver's seat on a tractor propelling the implement.

52. An implement as claimed in claim 48, wherein said structure is provided near its center with spaced supports whereby said indicator means can be stored on said supports.

53. An implement as claimed in claim 52, wherein said supports are connected to the same beam of said structure that said extensions are provided.

54. An implement as claimed in claim 53, wherein said supports extend substantially in a horizontal direction.

55. An implement as claimed in claim 52, wherein for arranging said indicator means on one of said supports, use may be made of a quick release, said quick release including a sleeve fastened to said indicator means, said sleeve being slipped onto part of one of said supports.

References Cited

UNITED STATES PATENTS

| | | | |
|---|---|---|---|
| 1,107,992 | 8/1914 | Parrish | 239—687 |
| 3,157,403 | 11/1964 | Van der Lely | 239—665 |
| 3,210,084 | 11/1965 | Van der Lely et al. | 239—666 XR |
| 3,239,231 | 3/1966 | Van der Lely et al. | 239—73 |

EVERETT W. KIRBY, *Primary Examiner.*

U.S. Cl. X.R.

239—665, 687